April 29, 1958 W. E. WALLES 2,832,697
METHOD FOR APPLYING ANTISTATIC AGENTS TO POLYMERIC SUBSTANCES
AND DESTATICIZED ARTICLES THEREBY OBTAINED
Filed April 30, 1956

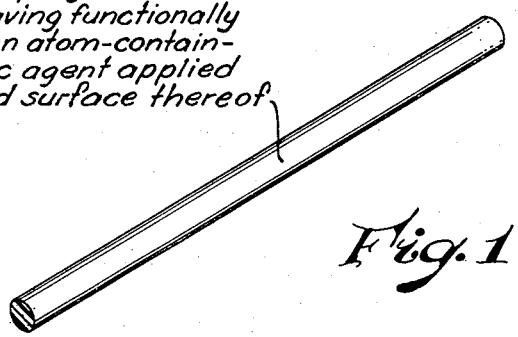

Destaticized polymeric filament having functionally basic nitrogen atom-containing antistatic agent applied to sulfonated surface thereof.

Fig. 1

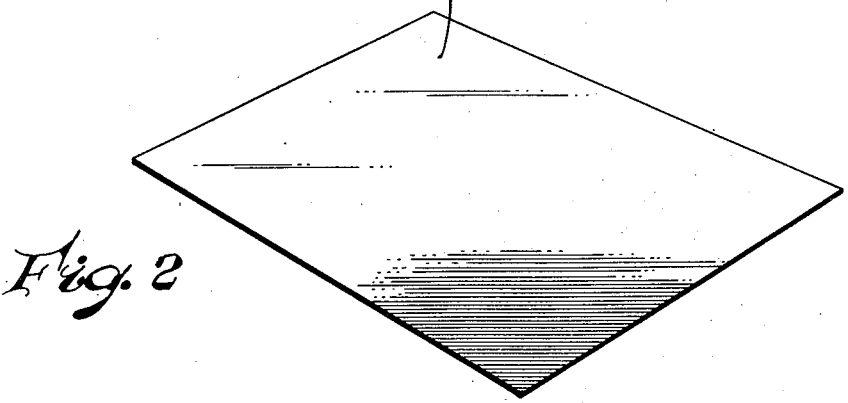

Destaticized polymeric film having functionally basic nitrogen atom-containing antistatic agent applied to sulfonated surface thereof.

Fig. 2

INVENTOR.
Wilhelm E. Walles
BY
Griswold & Burdick
ATTORNEYS

United States Patent Office 2,832,697
Patented Apr. 29, 1958

2,832,697

METHOD FOR APPLYING ANTISTATIC AGENTS TO POLYMERIC SUBSTANCES AND DESTATICIZED ARTICLES THEREBY OBTAINED

Wilhelm E. Walles, Midland, Mich., assignor to The Dow Chemical Company, Midland, Mich., a corporation of Delaware Application April 30, 1956, Serial No. 581,554

20 Claims. (Cl. 117—69)

This invention relates to a method for applying antistatic agents to various forms of hydrophobic compositions including shaped articles, comprised of substantially linear polymers and copolymers consisting essentially of a polyethylenic molecular chain to which are attached various nonaromatic, substituent groups or radicals so as to overcome their propensity for accumulating static electrical charges. It also has reference to the destaticized articles resulting from such application.

Various hydrophobic and essentially linear polymers and copolymers including those prepared from or containing polymerized quantities of such substances as vinyl chloride, vinylidene chloride, acrylonitrile and the like as well as such polymeric substances as halogenated polyethylene and the like consist essentially of a saturated polyethylenic molecular chain to which various non-aromatic substituent groups and radicals are attached. For convenience, such hydrophobic polymeric substances will herein be referred to as substituted, non-aromatic hydrocarbon polymers. Such terminology will be intended to bear especial reference to such hydrophobic and essentially linear polymeric substances as may be selected from the group consisting of polymers and copolymers of vinyl chloride; polymers and copolymers of vinylidene chloride (including the several sarans); polymers and copolymers of acrylonitrile; and chlorinated polyethylene. It also comprehends such polymeric substances, exclusive of polyethylene, as polypropylene, polybutylene and the like and substituted derivatives thereof.

Many of the hydrophobic, substituted, non-aromatic hydrocarbon polymers are possessed of attractive properties which make them desirable for employment in various shaped articles including fibers, filaments, yarns, threads (and fabrics constructed therefrom), ribbons, tapes, foils, films, sheets, moldings and the like. Shaped articles from such polymeric substances, however, exhibit an inordinate capacity for accumulating surface charges of static electricity. This characteristic makes them extremely difficult and unwieldy to manipulate and handle during various manufacturing operations and use applications. It also lessens their attractiveness in other aspects for being employed for many purposes. For example, many individuals may object to the delitescent electrical shocks they may be subject to or the sparks that may be discharged when they serve as the effective grounding means for substituted, non-aromatic, hydrocarbon polymer articles when there is a considerable accumulation of electrical charges on the articles. Furthermore, electrostatically charged substituted, non-aromatic, hydrocarbon polymer articles display great tendencies to collect dust and dirt and to have undesirably high degrees of soil retentivity. This, of course, limits their adaptability for being utilized in a completely satisfactory manner for many upholstery, furnishing, decorative and other uses.

While it would be highly advantageous to effectively and in a substantially permanent manner provide antistatic agents and materials on the surfaces of substituted, nonaromatic, hydrocarbon polymer articles, great difficulty has been encountered in achieving such a desideration, especially with antistatic agents of the frequently employed type having both hydrophobic and hydrophilic groups in their molecules. The significant chemical inertness of most substituted, non-aromatic, hydrocarbon polymers and the relatively smooth, sleek and impervious surfaces which occur on the vast majority of shaped articles from such polymeric materials usually prevent suitable chemical bonding or physical attachment, or both, from being obtained with the antistatic agents that may be applied thereto. As a consequence, most antistatic agents and materials are not sufficiently substantive for or adherescent on substituted, non-aromatic, hydrocarbon polymer articles to avoid having an undesirable susceptibility for being easily removed upon exposure to various solvents, including water and organic materials.

It is among the principal objects of the present invention to provide an improved method for applying antistatic agents containing both hydrophobic and hydrophilic groups in their molecules to substituted, non-aromatic, hydrocarbon polymer articles so that they might be less propense to develop static electric charges. It is also an object of the invention to provide a method for applying such antistatic agents to substituted, non-aromatic, hydrocarbon polymer articles so that the agents are effectively and substantially permanently retained on the articles despite rigorous exposure to washing and cleaning with water and organic materials and other solvent exposures. An additional object is to provide a more efficient method for utilizing antistatic agents so that they may be applied in minimum amounts, significantly less than the amounts conventionally required, for effective treatment. It is among the ancillary objects of the invention to provide destaticized substituted, non-aromatic, hydrocarbon polymer articles which result from practice of the method. It is a predominating object of the present invention to accomplish these intendments without detraction from or deletion of the other desirable characteristics and properties of such polymeric materials.

According to the present invention, all or any desired portion of the surface of a substituted, non-aromatic, hydrocarbon polymer or an article made therefrom may be destaticized by a method which comprises subjecting the surface of the substituted, non-aromatic, hydrocarbon polymer or article to the action of a sulfonating reagent selected from the group consisting of concentrated sulfuric acid containing at least about 80 percent by weight of $H_2SO_4$; oleum which contains less than about 20 percent by weight of dissolved, free sulfur trioxide; anhydrous solutions containing oleum which contains less than about 20 percent by weight of dissolved, free sulfur trioxide, and free sulfur trioxide; and subsequently applying to the thereby sulfonated surface an antistatic agent that has both hydrophobic and hydrophilic groups and contains a functional basic nitrogen atom in its molecule. More advantageously, the sulfonating reagent may be selected from the group consisting of concentrated sulfuric acid containing at least about 96 percent by weight of sulfuric acid; oleum which contains less than about 4 percent by weight of dissolved, free sulfur trioxide; anhydrous solutions containing oleum which contains less than about 4 percent by weight of dissolved, free sulfur trioxide; and free sulfur trioxide vapors. It may be desirable for free sulfur trioxide vapors to be diluted to a concentration as low as 10 percent or less, for example, with a suitable inert gas such as nitrogen.

Advantageously, the sulfonated surface may be washed free from excess sulfonating reagent prior to the application of the antistatic agent. Practice of the method of the invention, if carefully conducted, has no adverse effect on pigments and other additaments such as stabilizers and the like which may be dispersed throughout the substituted, nonaromatic, hydrocarbon polymer for various purposes. After application of the antistatic agent, the destaticized product may be employed satisfactorily in any application wherein it is desirable for it to be substantially free from surface accumulation of static electrical charges. The functionally basic nitrogen atom-containing antistatic agent is effectively and substantially permanently retained on destaticized substituted, non-aromatic, hydrocarbon polymer articles in accordance with the invention.

While the surface sulfonation of the substituted, non-aromatic, hydrocarbon polymer may be accomplished with any of the sulfonating agents of the invention, it is, as has been indicated, usually more advantageous to employ sulfuric acid which contains at least about 96 percent by weight of $H_2SO_4$ or an oleum (which sometimes is known as fuming sulfuric acid) which contains from trace amounts to about 4 percent by weight of dissolved, free sulfur trioxide. If desired, the oleum can also be employed advantageously in anhydrous solutions or mixtures with other materials such as acetic anhydride and the like which permit effective quantities of the sulfur trioxide to be available in an amount which is equivalent to that which is provided in the oleum. In certain instances, it may be convenient to employ free sulfur trioxide vapors for the sulfonation.

Generally a satisfactory degree of surface sulfonation of the hydrophobic substituted, non-aromatic hydrocarbon polymer article may be obtained when operating at temperatures between the freezing point of the sulfonating reagent and about 90° C. for periods of time ranging from matters of merely several seconds, or even almost instantaneous periods which involve mere fractions of seconds, to hours. Frequently, when sulfuric acid is employed which contains at least about 96 percent by weight of $H_2SO_4$ the treatment may be performed suitably at an operating temperature of about 50° C. within a time period of about ten minutes. When an oleum is employed which contains dissolved, free sulfur trioxide in amounts ranging from traces to about 4 percent by weight, the treatment may be performed suitably at an operating temperature of about 30° C. within a time period of about five minutes.

The degree of surface sulfonation which is obtained on the substituted, non-aromatic, hydrocarbon polymer article predetermines the relative quantity of the antistatic agent that may be effectively and permanently attached thereto upon its subsequent application and, for all practical purposes, precurses the results which may be realized by practice of the invention. The degree of sulfonation that may be obtained in any particular instance is somewhat interdependent on the nature of the substituted, non-aromatic, hydrocarbon polymer and the specific physical form or structure of the polyethylene article that is being treated, the strength or effective sulfur trioxide concentration of the reagent, the operating temperature and the length of the treatment. Care should be taken to avoid sulfonation conditions which may be too strong or vigorous, as may occur when an oleum is employed with a relatively high free sulfur trioxide content at too high a temperature or for too long a period of time. Care should also be taken to employ more moderate treating conditions upon more delicate structures such as fine filaments or fibers and the like. If such precautions are not asiduously observed, the substituted, non-aromatic, hydrocarbon polymer article may be caused to decompose and degrade resulting in its being darkened and discolored to an intolerable extent. Conversely, optimum destaticizing results may not be obtained if overly weak sulfonating conditions are employed which may not sufficiently modify the surface of the substituted, non-aromatic, hydrocarbon polymer article to permit a suitably beneficial quantity of the antistatic agent to be effectively and permanently applied thereto.

The functionally basic nitrogen atom-containing antistatic agent having both hydrophobic and hydrophilic groups in its molecule that may be employed in the practice of the invention may be a primary, secondary or tertiary amine type of material or it may be an amide or a material in which the functional nitrogen atom is contained in a heterogeneous ring system. Advantageously, for example, it may be an aminepolyoxyalkylene type of material. A material of the type that is the condensed product of a long chain fatty acid amine containing from 8 to 16 carbon atoms in its molecule and a polyoxyethylene that contains an average of from 5 to 40 and, advantageously, in the neighborhood of 20 ethoxy groups may frequently be employed with especial benefit. Such a material is a readily available product, being commercially obtainable, for example, from the Atlas Powder Company under the trade-designation "G 3780."

Other functionally basic nitrogen atom-containing antistatic agents that may be employed advantageously in the practice of the present invention include such commercially available materials and their equivalents as are included in the following tabulation which sets forth a designation of what is believed to be the general type of material involved and includes their commercial tradenames or trade-designations and the names of the manufacturers from whom they have been available.

| Type of Antistatic Agent | Trade-Name | Manufacturer |
|---|---|---|
| Substituted oxazolines | "Alkaterge A"<br>"Alkaterge E"<br>"Alkaterge T"<br>"Alkaterge C" | Commercial Solvents Corporation. |
| Fatty alkylolamine condensate | "Alromine RA" | Geigy Chemical Company. |
| Fatty alkylol amide condensate | "Alrosol B"<br>"Alrosol C"<br>"Alrosol H"<br>"Alrosol O"<br>"Alrosol S" | Do. |
| Fatty amine condensate | "Alrosperse 11P" | Do. |
| Alkyl polyoxyethylene glycol amide | "Antarox G-100" | Antara Chemicals Division of General Aniline & Film Corp. |
| Amine condensate | "Apexomide" | Apex Chemical Company. |
| Coconut fatty acid amine condensate | "Base 301-R" | E. F. Drew & Co. |
| Polyethanolamine condensate of a fatty acid | "Cerfak N-100" | E. F. Houghton & Company. |
| High molecular weight amide condensation product | "Clavolene Conc." | Dexter Chemical Company. |
| Amino condensation product | "Detergent M" | Ciba Company. |
| Alkanolamine condensate | "Detergent 80" | Peck's Products Company. |
| Fatty amide condensate | "Dianol G" | Quaker Chemical Products Corp. |
| Sodium polyamino condensate | "Drukeel 8" | E. F. Drew & Co. |
| Substituted oleoyl glyoxalidine ethyl sulfate | "Drustat-F"<br>"Drustat-H" | Do. |
| Coconut fatty acid amino condensate | "Druterge CR" | Do. |
| Alkanolamine fatty acid condensate | "Emcol 5100" | Emulsol Chemical Corporation. |
| Alkanolamine condensate | "Emcol 5130"<br>"Emcol 5137"<br>"Emcol 5138A" | Do. |
| Amide amino condensate | "Emkagen Concentrate" | Emkay Chemical Company. |
| $CH_3(CH_2)_n COOCHCH_2NHCOCH_2N \begin{smallmatrix} Cl \\ \\ C_2H_5 \end{smallmatrix}$ | "Emulsept" | Emulsol Chemical Corporation. |
| Tertiary amines; ethylene oxide condensation products of primary fatty acids. | "Ethomeen" | Armour & Co. |
| Fatty acid condensate of N-methyl glucamine and coconut fatty acids. | "Glucaterge-12" | Commercial Solvents Corporation. |
| Fatty acid condensate of N-methyl glucamine and cottonseed fatty acids. | "Glucaterge-28" | Do. |
| Modified lauroyl imidazolene hydroxy acetate | "Miranol OH" | Miranol Chemical Company. |
| Compounds formed by addition of propylene oxide to ethylene diamine followed by addition of ethylene oxide. | "Tetronics" | Wyandotte Chemicals Corporation. |
| Substituted amide of alkyl phosphate<br><br>$RNH-\overset{O}{\underset{OR'}{\overset{\|}{P}}}-ONH_3R$<br><br>$R = C_{12}H_{25}$.<br>$R' =$ Water solubilizing group. | "Victamine C" | Victor Chemical Company. |

Since the application of the antistatic agent on the sulfonated polymeric surface is essentially in the nature of a metathetical reaction, there is little criticality involved in the conditions of its employment with respect to time, temperature and concentration. It is usually beneficial and convenient, however, to apply it from a relatively low concentration dispersion or solution in a suitable liquid medium such as water. This manner of employment permits immersion of the sulfonated substituted, non-aromatic, hydrocarbon polymer in an applicating bath of the antistatic agent although, if desired, other applicating techniques may also be utilized for the antistatic agent. The extremely effective and substantially permanent retention of the antistatic agent by the substituted, non-aromatic, hydrocarbon polymer in the practice of the invention is believed to be due to the combined bonding influence of the so-called Van der Waal's forces to the surface of the hydrophobic portion (usually hydrocarbon in nature) of the antistatic agent's molecule and the additional ionic attraction that is involved between the sulfonated surface and the functionally basic nitrogen atom-containing antistatic agent that is applied thereto. This permits an effective treatment to be accomplished with much smaller quantities of an antistatic agent, frequently in an amount which need only be $\frac{1}{10}$ or less as much, in comparison to that which is conventionally required.

Any desired degree of destaticization of the substituted, non-aromatic, hydrocarbon polymer article may be effected. Generally, within the limits of beneficial operating conditions, longer and more intense sulfonations permit the subsequent application of greater amounts of the antistatic agent to yield products having greater degrees of antistatic characteristics. It is possible, for example, to prepare a substituted, non-aromatic, hydrocarbon polymer article that is sufficiently destaticized so as to be substantially completely antistatic in character. Advantageously, the invention may be practiced with fabricated articles including fibers, filaments, yarns, threads, ribbons, tapes, foils, films, sheets, moldings and the like and on materials constructed therefrom such as cloth and fabric from textile fibers, filaments and the like of the substituted, non-aromatic, hydrocarbon polymer. As indicated, an entire surface need not be destaticized on such fabricated articles as films and moldings or on other articles. If it is not desired or required to obtain the benefit of a completely destaticized surface, only certain preferred areas or portions of a surface may be treated in accordance with the invention.

In the accompanying drawing there is schematically illustrated a filament in Figure 1 and a sheet in Figure 2 as being typical substituted, non-aromatic, hydrocarbon polymer articles whose surfaces may advantageously be destaticized in accordance with the present invention. The following examples are given to further illustrate the invention.

*Example 1*

A film comprised of a copolymer of vinylidene chloride and acrylonitrile containing a major proportion of vinylidene chloride in the polymer molecule was immersed in 100 percent concentrated sulfuric acid at a temperature of about 60° C. for about five minutes. After being sulfonated, the film was washed thoroughly in water and then immersed in a 1 percent by weight aqueous solution of a fatty acid aminepolyoxyethylene condensate antistatic agent obtained from Atlas Powder Company under the trade-designation "G 3780" which was maintained at a temperature of about 50° C. The immersion was continued for about five minutes before the treated film was removed from the solution of the antistatic agent, washed thoroughly with water and dried. Its surface resistivity, which is an indication of its antistatic properties, was then tested by tautly connecting a sample of the destaticized film between two electrodes, each of which were 7 centimeters long, spaced parallel 4 centimeters apart and across which there was applied a 500 volt direct current potential. The test was conducted at room temperature under about 80 percent relative humidity. The surface resistivity of the destaticized film was found to be between about $10^8$–$10^9$ ohm-centimeters. In comparison, untreated film of the same type has a surface conductivity between about $10^{12}$–$10^9$ ohm-centimeters. As is generally understood, a surface which is relatively more electrically conductive or less resistive is usually more antistatic in nature in that it tends less to accumulate charges of static electricity.

*Example II*

Three samples of the same film as were employed in the first example were obtained and designated Samples "A," "B" and "C." Sample "A" was not sulfonated and was washed only with hot water while Samples "B" and "C" were given the same sulfonation treatment, followed by washing, as was employed in Example I. The surface resistivity of each of the samples, expressed as their resistance in megohms, was then determined in accordance with the foregoing procedure. They were as follows:

| Sample | "A" | "B" | "C" |
|---|---|---|---|
| Resistance in megohms | more than 5,000,000 | 100,000 | 100,000 |

All of the samples were then immersed for five minutes in a 1 percent by weight aqueous solution of "G 3780" antistatic agent at 50° C., after which they were washed in cold water for five muates. Their surface resistivity was then measured and, as indicated in the following tabulation, they were all found to have become destaticized, although the effect was much less pronounced in Sample "A":

| Sample | "A" | "B" | "C" |
|---|---|---|---|
| Resistance in megohms | 2,000,000 | 800 | 800 |

Each of the samples was then washed in water for about ½ hour at 55° C. Upon additional testing, Sample "A" was found to have lost its antistatic characteristics, as evidenced by a return to its original resistance value. This is shown below:

| Sample | "A" | "B" | "C" |
|---|---|---|---|
| Resistance in megohms | more than 5,000,000 | 800 | 800 |

The three samples were then washed for five minutes in acetone and retested electrically. No detectable change in the antistatic characteristics of the destaticized samples were obtained, despite the severely extractive exposures to which they had been subjected. The final results are as follows:

| Sample | "A" | "B" | "C" |
|---|---|---|---|
| Resistance in megohms | more than 5,000,000 | 800 | 800 |

Similar excellent results may be obtained when other sulfonating conditions within the scope of the invention are employed on articles comprised of polymers of vinyl chloride; articles comprised of copolymers of vinylidene chloride and vinyl chloride; and articles comprised of chlorinated polyethylene containing from about 2 to 60 percent by weight of substituted chlorine in the polymer molecule and when other antistatic agents containing functional basic nitrogen atoms, particularly amine-polyoxyalkylene type materials, are utilized.

It is to be fully understood that the present invention is to be construed and interpreted not by the foregoing didactic description and specification but in the light of what is set forth and defined in the appended claims.

What is claimed is:

1. Method for destaticizing hydrophobic, substituted, non-aromatic hydrocarbon polymers and articles made therefrom comprised of substantially linear polymers and copolymers consisting essentially of the polyethylenic molecular chain to which are attached non-aromatic substituents which comprises subjecting the surface of the polymer to a sulfonating reagent which is selected from the group consisting of concentrated sulfuric acid containing at least about 80 percent by weight of $H_2SO_4$; oleum which contains less than about 20 percent by weight of dissolved, free sulfur trioxide; anhydrous solutions containing oleum which contains less than about 20 percent by weight of dissolved, free sulfur trioxide; and free sulfur trioxide; and subsequently applying to the sulfonated surface an antistatic agent that has both hydrophobic and hydrophilic groups and contains a functional basic nitrogen atom in its molecule.

2. The method of claim 1 wherein the article is comprised of polymeric substances selected from the group consisting of polymers and copolymers of vinyl chloride; polymers and copolymers of vinylidene chloride; polymers and copolymers of acrylonitrile; and chlorinated polyethylene.

3. The method of claim 1 wherein the reagent is comprised of concentrated sulfuric acid containing at least about 96 percent by weight of $H_2SO_4$.

4. The method of claim 1 wherein the reagent is comprised of oleum which contains between trace amounts and about 4 percent by weight of dissolved, free sulfur trioxide.

5. The method of claim 1 wherein the article is subjected to the sulfonating reagent at a temperature between the freezing point of the reagent and about 90° C.

6. The method of claim 1 and including the steps of washing the sulfonated article free from the sulfonating reagent before applying the antistatic agent; washing the article after application of the antistatic agent; and drying the destaticized article.

7. The method of claim 1 wherein the functionally basic nitrogen atom in the antistatic agent is contained in a heterogeneous ring system in the antistatic agent's molecule.

8. The method of claim 1 wherein the antistatic agent is an amine-polyoxyalkene type of material.

9. The method of claim 1 wherein the antistatic agent is a fatty acid amine-polyoxyalkylene type of material.

10. The method of claim 1 wherein the antistatic agent is the condensed product of a long chain fatty acid amine containing from 8 to 16 carbon atoms in its molecule and a polyoxyethylene that contains an average of from 5 to 40 ethoxy groups.

11. A destaticized, solid, hydrophobic, substituted, hydrocarbon polymer comprised of substantially linear polymers and copolymers consisting essentially of the polyethylenic molecular chain to which are attached non-aromatic substituents said polymer having a sulfonated surface to which is applied and bonded an antistatic agent that has both hydrophobic and hydrophilic groups and contains a functional basic nitrogen atom in its molecule.

12. The destaticized polymer of claim 11 comprised of a polymeric substance selected from the group consisting of polymers and copolymers of vinyl chloride; polymers and copolymers of vinylidene chloride; polymers and copolymers of acrylonitrile; and chlorinated polyethylene.

13. The destaticized polymer of claim 11 comprised of a copolymer of vinylidene chloride that contains a major proportion of vinylidene chloride polymerized in the copolymer molecule.

14. The destaticized polymer of claim 11 wherein the functionally basic nitrogen atom in the antistatic agent is contained in a heterogeneous ring system in the antistatic agent's molecule.

15. The destaticized polymer of claim 11 wherein the antistatic agent is an amine-polyoxyalkylene type of material.

16. The destaticized polymer of claim 11 wherein the antistatic agent is a fatty acid amine-polyoxyalkylene type of material.

17. The destaticized polymer of claim 11 wherein the antistatic agent is the condensed product of a long chain fatty acid amine containing from 8 to 16 carbon atoms in its molecule and a polyoxyethylene that contains an average of from 5 to 40 ethoxy groups.

18. A shaped polymeric article in accordance with claim 11.

19. A polymeric film in accordance with claim 11.

20. A polymeric filamentary article in accordance with claim 11.

References Cited in the file of this patent

UNITED STATES PATENTS

| | | |
|---|---|---|
| Re. 23,062 | Horton | Sept. 20, 1955 |
| 2,255,940 | Rogers | Sept. 16, 1941 |
| 2,400,720 | Staudinger | May 21, 1946 |
| 2,576,980 | Treue | Dec. 4, 1951 |
| 2,626,876 | Carnes | Jan. 27, 1953 |
| 2,727,831 | Dixon | Dec. 20, 1955 |

OTHER REFERENCES

Vojulskii et al.: Doklag Akad. Nak. S. S. S. R. 73; C. A. 45: 899c.